United States Patent
Wille et al.

(10) Patent No.: US 6,841,616 B2
(45) Date of Patent: Jan. 11, 2005

(54) POLYMERIZATION OF HALOGEN-CONTAINING MONOMERS USING SILOXANE SURFACTANT

(75) Inventors: Roice Andrus Wille, Malvern, PA (US); Lotfi Hedhli, Ardmore, PA (US); Mehdi Durali, West Whiteland Township, PA (US); Sayed Youssef Antoun, Brussels (BE)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/401,499

(22) Filed: Mar. 28, 2003

(65) Prior Publication Data

US 2004/0192836 A1 Sep. 30, 2004

(51) Int. Cl.⁷ ............................................. C08K 5/5419
(52) U.S. Cl. ........................ 524/731; 524/806; 526/254; 526/250; 526/242; 526/255
(58) Field of Search ................................ 524/731, 805; 526/250, 242, 255, 254

(56) References Cited

U.S. PATENT DOCUMENTS

| | | | |
|---|---|---|---|
| 4,360,652 A | 11/1982 | Dohany | 526/210 |
| 4,524,197 A | 6/1985 | Khan | 526/206 |
| 4,569,978 A | 2/1986 | Barber | 526/206 |
| 5,763,552 A | 6/1998 | Feiring et al. | 526/214 |
| 6,013,747 A | 1/2000 | Abusleme et al. | 526/206 |
| 6,255,384 B1 * | 7/2001 | McCarthy et al. | 524/805 |
| 6,284,853 B1 * | 9/2001 | Yamana et al. | 526/245 |

FOREIGN PATENT DOCUMENTS

| | | |
|---|---|---|
| EP | 0 721 974 | 7/1999 |
| EP | 0 816 397 | 2/2001 |
| WO | WO 97/14720 | 4/1997 |
| WO | WO 97/17381 | 5/1997 |
| WO | WO 98/20055 | 5/1998 |

OTHER PUBLICATIONS

Patent Abstracts of Japan Abstracting Application No. 55147433, "Polymerization of Fluorine–Containing Monomer", Filed on Oct. 21, 1980, Date of Publication: Apr. 30, 1982, Applicant: Nok Corp.

* cited by examiner

Primary Examiner—Margaret G. Moore
(74) Attorney, Agent, or Firm—RatnerPrestia

(57) ABSTRACT

Halogenated polymers are prepared by a process comprising polymerizing at least one halogen-containing monomer in an aqueous medium containing monomer, radical initiator, and siloxane surfactant. The medium may optionally contain one or more of an antifoulant, a buffering agent and a chain-transfer agent.

66 Claims, No Drawings

POLYMERIZATION OF HALOGEN-CONTAINING MONOMERS USING SILOXANE SURFACTANT

FIELD OF THE INVENTION

The present invention relates to methods of polymerization of halogen-containing monomers.

BACKGROUND OF THE INVENTION

Fluoropolymners are primarily produced via heterogeneous polymerization reactions, including suspension, emulsion and microemulsion systems. Generally, each of these reactions requires at least one monomer and a radical initiator in a suitable reaction medium. In addition, emulsion polymerizations of halogen-containing monomers generally require a surfactant capable of emulsifying both the reactants and the reaction products for the duration of the polymerization reaction. The surfactant of choice in the synthesis of fluoropolymers is generally a perfluoroalkyl surfactant. The most common perfluoroalkyl surfactant in the production of halogenated polymers is ammonium perfluorooctanoate (AFPO). Non-fluorinated surfactants typically are not used, because they have the disadvantages of inhibiting the reaction, and affecting the molecular weight and other properties of the product, such as color.

The emulsion polymerization of vinylidene fluoride ($VF_2$) using a fluorinated surfactant and isopropyl peroxydicarbonate (IPP) as a free-radical initiator, is taught in U.S. Pat. No. 3,475,396. This polymerization process has since been refined to provide polymers having various improved properties. See, U.S. Pat. Nos. 3,857,827, 4,076,929, 4,360,652, 4,569,978, 6,187,885. The emulsion polymerization of $VF_2$ using a partially fluorinated surfactant and an inorganic peroxide initiator is taught in U.S. Pat. No. 4,025,709.

The use of perfluorinated surfactants has recently become the focus of increasing scrutiny due to safety and environmental concerns. A primary property of perfluoroalkyl surfactants that underlies their utility in polymerization reactions is their stability to the reaction conditions. Because of their resistance to chemical degradation, fluoroalkyl surfactants have the potential to accumulate in the environment and in organisms.

Several different approaches have attempted to reduce or eliminate the use of perfluoroalkyl surfactants in the polymerization of halogen-containing monomers.

Some emulsion polymerization processes have been demonstrated which employ partially fluorinated surfactants instead of perfluorinated surfactants. See, U.S. Pat. Nos. 4,524,197, 5,763,552. Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

In another modification, the perfluoroalkyl surfactant was eliminated by employing a surfactant-free polymerization process, but the process described therein often relied on the use of metal salts as promoters, which metal salts can contaminate the product. See, WO 97 17381 and *J. Appl. Polym. Sci.*, 2211, 70, 1998.

New polymerization processes are needed that utilize non-perfluoroalkyl surfactants or reduced amounts of perfluoroalkyl surfactants.

SUMMARY OF THE INVENTION

The present invention provides a process for preparing a halogenated polymer inclusive of copolymer. The process comprises polymerizing at least one halogen-containing monomer in an aqueous medium comprising at least one siloxane surfactant, in the presence of at least one radical initiator. The process may be conducted by providing, in a reactor, a reaction mixture comprising the halogen-containing monomer, radical initiator, and a siloxane surfactant in an aqueous medium. The medium optionally comprises one or more of a buffering agent, a chain-transfer agent, an antifoulant agent, and one or more non-siloxane surfactants. The halogen-containing monomer is polymerized in the aqueous medium to form a polymer.

In some embodiments of the invention, the siloxane surfactant is the only surfactant in the polymerization reaction.

In other embodiments of the invention, a siloxane surfactant is added to the polymerization reaction mixture in combination with a perfluoroalkyl surfactant.

In still other embodiments of the invention, a siloxane surfactant is added to the polymerization reaction mixture in combination with a non-fluorinated hydrocarbon surfactant.

In some embodiments of the invention, the siloxane surfactant has the formula I:

wherein

Q is a hydrophobic siloxane moiety;

R is a monovalent hydrophilic moiety; and

T is —($C_1$–$C_6$)alkylene-, wherein each T is bonded to a silicon atom in Q; and X is an integer from 1 to 300; or a salt of such a compound.

In some embodiments, x is an integer from 1 to 100. In other embodiments, x is in integer from 1 to 50. In yet other embodiments, x is an integer from 1 to 30.

In some embodiments, T is —($C_1$–$C_3$)alkylene-.

In some embodiments of the invention, the siloxane moiety comprises hydrocarbyl substituents on silicon atoms. The hydrocarbyl substituents are preferably selected from the group consisting of $C_1$–$C_8$)alkyl and phenyl, more preferably methyl and phenyl.

In a sub-embodiment of the invention, the siloxane surfactant is a compound of formula II, III or IV:

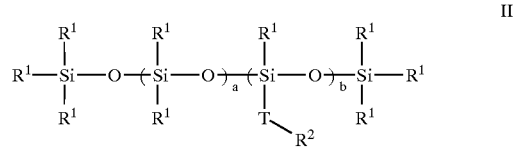

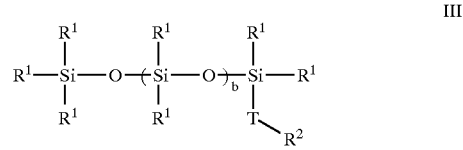

-continued

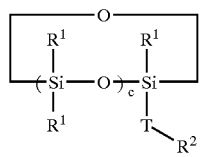
IV wherein
a is an integer from 0 to 300;
b is an integer from 1 to 300, wherein the sum of a and b is less than or equal to 301;
c is an integer selected from 3, 4 and 5, preferably, 3 or 4;
each $R^1$ is independently selected from $-(C_1-C_8)$ hydrocarbyl;
each $R^2$ is a hydrophilic moiety independently selected from the group consisting of:
—O(C=O)C=O)($SO_3^-M^+$)$CH_2CO_2^-M^+$,
—$OCH_2$—CH(OH)—$CH_2SO_3^-M^+$,
—$OCH_2$—C($C_2H_5$)($CH_2OSO_3^-M^+$,
—$OCH_2$—CH(OH)—$CH_2$—NH($CH_2$)$_2$—$SO_3^-M^+$,
—OP(=O)(OH)($O^-M^+$),
—$OCH_2$—CH(OH)—$CH_2N^+(R^4)_2CH_2CO_2^-$,
—$OCH_2$—CH(OH)—$CH_2N^+(R^4)_2CH_2SO_3^-$,
—$N^{30}(R^4)_3Y^-$,
—$N^+(R^4)_2$—($CH_2$)$_3SO_3^-$,
—$N^+(R^4)_2(CH_2)_3CO_2$—,
a polyether radical,
a polyol radical,
a pyrrolidinone radical,
a monosaccharide radical,
a disaccharide radical; and
a polyelectrolyte radical;
each T is —$(C_1-C_6)$alkylene-;
$R^3$ is selected from $R^1$ and —T—$R^2$;
each $R^4$ is independently selected from the group consisting of —H and —$(C_1-C_8)$alkyl;
each M is a monovalent cation, preferably $NR^4_4{}^+$ or an alkali metal cation; and
each Y is a monovalent anion;
or a salt of such a compound;
provided:
when $R^2$ is a pyrrolidinone radical, it is bonded to T through the nitrogen atom of the pyrrolidinone radical;
when $R^2$ is a monosaccharide radical, it is covalently bonded to T through an oxygen atom of the monosaccharide radical; and
when $R^2$ is a disaccharide radical, it is covalently bonded to T through an oxygen atom of the disaccharide radical.

A polyether radical is preferably composed of ethylene oxide (EO) units or mixed ethylene oxide and propylene oxide (EO/PO) units wherein the ratio of ethylene oxide to propylene oxide may be varied from about 10 wt. % EO to 100 wt. % EO. The overall degree of polymerization is less than about 500, i.e., the combined number of EO and PO units may be up to about 500.

A polyether radical is preferably end-capped with —OH or —$OR^4$, wherein $R^4$ is defined as above.

Polyelectrolyte radicals include, for example, radicals of acrylic and methacrylic acid polymers, and radicals of acrylic and methacrylic acid copolymers with acrylate and methacrylate esters, and salts thereof.

In one sub-embodiment of the invention, $R^1$ is independently selected from the group consisting of phenyl and —$(C_1-C_8)$alkyl, preferably phenyl and methyl, more preferably methyl.

In another sub-embodiment of the invention, T is —$(C_1-C_3)$alkylene-.

In another embodiment of the invention, there is provided a composition for polymerizing a halogen-containing monomer, comprising at least one halogen-containing monomer, at least one siloxane surfactant and at least one radical initiator in an aqueous medium.

In some sub-embodiments, b is an integer from 1 to 100. In other embodiments b is an integer from 1 to 50. In yet other embodiments, b is an integer from 1 to 30.

In a preferred sub-embodiment thereof, the at least one siloxane surfactant comprises from about 0.05 to about 2 weight percent, more preferably from about 0.1 to about 0.5 weight percent for each surfactant, based on the total weight of monomer used in the polymerization reaction.

In some sub-embodiments, the halogen-containing monomer is selected from the group consisting of vinylidene fluoride, trifluoroethylenevinylidene difluoride, tetrafluoroethylene, trifluoroethylene, chlorotrifluoroethylene, hexafluoropropylene, vinyl fluoride, hexafluoroisubutylene, perfluorobutylethylene, pentafluoropropene and combinations thereof.

In a preferred sub-embodiment thereof, the halogen-containing monomer comprises vinylidene fluoride.

In another embodiment of the invention, there is provided a stable polymer latex composition comprising halogen-containing polymer solids, at least one siloxane surfactant and at least one radical initiator.

The term "alkyl", by itself or as part of another substituent means, unless otherwise stated, a straight, branched or cyclic chain hydrocarbon radical, including di-radicals, having the number of carbon atoms designated (i.e. $C_1-C_8$ means one to eight carbons). Straight chain, alkyl is preferred. Examples include: methyl, ethyl, propyl, isopropyl, butyl, isobutyl, tert-butyl, pentyl, neopentyl, hexyl, cyclohexyl and cyclopropylmethyl. $(C_1-C_8)$alkyl is preferred. Most preferred is $(C_1-C_4)$alkyl, particularly, methyl.

The term "hydrocarbyl" refers to any moiety comprising only hydrogen and carbon atoms. Hydrocarbyl includes, for example, alkyl, alkenyl, alkynyl, aryl and benzyl groups. Preferred is $(C_1-C_8)$hydrocarbyl, more preferably phenyl and alkyl. Particularly preferred is $(C_1-C_8)$alkyl, Most preferably methyl.

The term "siloxane" refers to a siloxane polymer formed of a backbone of repeating siloxane (—O—Si—) units comprising two hydrocarbyl moieties attached to each silicon atom:

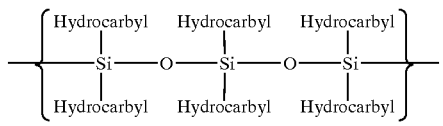

The expression "siloxane surfactant" refers to a surfactant compound whose chemical structure comprises a hydrophilic portion and also a portion that includes at least one dihydrocarbylsiloxane unit:

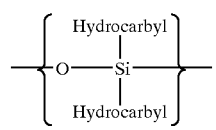

The siloxane surfactant possesses surface active properties, i.e. acts as a surfactant.

The expression "halogen-containing monomer" or "halogenated monomer" means a monomer containing a polymerizeable double bond which contains at least one halogen atom, haloalkyl group or haloalkoxy group, attached to the double bond of the monomer that undergoes polymerization. The halogen atom or atoms is/are typically covalently bonded to a carbon atom in the resulting polymer chain.

The term "haloalkyl" refers to alkyl groups that contain at least one halogen atom covalently bonded to a carbon atom. Examples include, difluoromethyl, trifluoromethyl, pentafluoroethyl and trichloromethyl.

The term "haloalkoxy" refers to alkoxy groups that contain at least one halogen atom covalently bonded to a carbon atom. Examples include, difluoromethoxy, trifluoromethoxy, pentafluoroethoxy and trichloromethoxy.

The expression "halogen-containing polymer" or "halogenated polymer" means a polymer formed from polymerization of at least one halogen-containing monomer. The polymerization may eter include one or more non-halogen containing monomers.

The term "polymer" as used herein is intended to be inclusive of homopolymers, copolymers, terpolymers and higher polymers.

The term "fluoropolymer" means a halogenated polymer wherein the at least one halogen atom in the structure of the precursor halogen-containing monomer is fluorine. Preferred fluoropolymers include polyvinylidene fluoride and copolymers containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene. Other co-monomers that would readily copolymerize with vinylidene fluoride may also be used in generating fluoropolymers according to the present invention.

The term "initiator" or the expressions "radical initiator" or "free radical initiator" refer to a chemical with a low energy bond that is capable of providing a source of free radicals, either induced spontaneously, or by heat or light. Examples include peroxides, peroxydicarbonates and azo compounds. The expression also includes redox systems useful in providing a source of free radicals.

The term "radical" refers to a chemical species that contains at least one unpaired electron.

The expression "monosaccharide radical" means a monosaccharide, i.e., a simple sugar, which comprises any of a class of simple carbohydrates, such as tetroses, pentoses, and hexoses, that cannot be broken down to simpler sugars by hydrolysis, and which contains an unpaired electron on an oxygen atom. Examples include glucose and fructose radicals. The term is also inclusive of radicals of deoxy monosaccharides such as ribose and of radicals of amino monosaccharides such as glucosamine wherein the unpaired electron may also be located on a nitrogen atom.

The expression "disaccharide radical" means a disaccharide, i.e., any of a class of sugars, including lactose and sucrose, that arc composed of two monosaccharides connected by an ether linkage, which contains an unpaired electron on any oxygen atom except the oxygen atom linking the two monosaccharides. Examples include sucrose radical.

The expression "polyether radical" means a polymeric radical composed of monomer units which may be, for example, ethoxy (—OCH$_2$CH$_2$—) or propoxy (—OCH(CH$_3$)CH$_2$—) units or a mixture thereof, which contains an unpaired electron on an oxygen atom, wherein the oxygen atom is not an ether oxygen bonded to two of the ethoxy or propoxy groups.

The expression "polyelectrolyte radical" means a polymeric radical composed of monomer units that may exist as charged species in the pH range in which emulsion polymerization reactions such as those described herein are performed.

DETAILED DESCRIPTION OF THE INVENTION

According to the present invention, halogen-containing polymers are prepared by polymerization reactions, particularly emulsion polymerization reactions, that employ at least one siloxane surfactant. One or more halogen-containing monomers is polymerized in an aqueous medium in the presence of a radical initiator and at least one siloxane surfactant. Prior art methods for preparation of halogenated polymers employ perfluoroalkyl surfactants, even though such surfactants are associated with environmental and health concerns. In contrast, the practice of the present invention provides for polymerization of halogen-containing monomers employing substantially reduced amounts of perfluoroalkyl surfactants, or no perfluoroalkyl surfactants.

Polymerization processes that may utilize siloxane surfactants according to the present invention include, for example, emulsion polymerization processes such as those disclosed in U.S. Pat. Nos. 2,559,752; 3,271,341; 3,625,926; 4,262,101; 4,076,929; 4,380,618; 4,569,978; 4,621,116; 4,789,717; 4,864,006; 5,093,427; 5,688,884; 5,763,552; 5,789,508; 6,187,885; 6,395,848; and 6,429,258, the entire disclosures of which are incorporated herein by reference.

According to the present invention, homopolymerization of a halogen-containing monomer or copolymerization of one or more comonomers, wherein at least one of the monomers is a halogen-containing monomer, is carried out in an aqueous emulsion containing a radical initiator. The temperature of the reaction is typically from about 20° C. to about 160° C., although lower and higher temperatures are possible. The reaction pressure is typically from about 280 kPa to about 20,000 kPa. Higher pressures may be employed if the reactor and associated equipment will tolerate such pressures.

According to one embodiment, the polymerization reaction is carried out by charging a polymerization reactor with water (preferably deionized water) a siloxane surfactant, and a radical initiator. The reactor contents are preferably agitated and heated to the desired reaction temperature with the exclusion of air. At least one halogen-containing monomer, and optionally additional initiator, is added to start and maintain the polymerization reaction. Additional monomer may be optionally added to replenish monomer that is consumed as the reaction proceeds.

Halogen-Containing Monomers

Halogen-containing monomers useful in the practice of the invention include, for example, vinylidene fluoride; trifluoroethylenevinylidene difluoride, tetrafluoroethylene;

trifluoroethylene; chlorotrifluoroethylene; hexafluoropropylene; vinyl fluoride; hexafluoroisobutylene; perfluorobutylethylene; pentafluoropropene and combinations thereof. According to one preferred embodiment, the polymerization method is used to prepare homopolymers of vinylidene fluoride. According to another preferred embodiment, copolymers are prepared by copolymerizing vinylidene fluoride with a comonomer selected from the group consisting of tetrafluoroethylene; trifluoroethylene; chlorotrifluoroethylene; hexafluoropropene; vinyl fluoride; hexafluoroisobutylene; perfluorobutylethylene; pentafluoropropene; fluorinated vinyl ethers, such as, for example, perfluoromethyl vinyl ether; perfluoro-n-propyl vinyl ether and perfluoro-2-propoxypropyl vinyl ether; fluorinated and non-fluorinated allyl ethers; fluorinated dioxoles, such as, for example, perfluoro(1,3-dioxole) and perfluoro(2,2-dimethyl)-1,3-dioxole; and combinations thereof.

Particularly preferred are copolymers of vinylidene fluoride comprising from about 70 to about 99 mole percent vinylidene fluoride, and correspondingly from about 1 to about 30 mole percent tetrafluoroethylene; from about 70 to about 99 mole percent vinylidene fluoride, and correspondingly from about 1 to about 30 mole percent hexafluoropropene (such as disclosed in U.S. Pat. No. 3,178,399); and from about 70 to about 99 mole percent vinylidene fluoride, and correspondingly from about 1 to about 30 mole percent trifluoroethylene.

The method of the invention is also suitable for preparing halogen-containing terpolymers, such as terpolymers of vinylidene fluoride, hexafluoropropene and tetrafluoroethylene as described in U.S. Pat. No. 2,968,649, and terpolymers of vinylidene fluoride, trifluoroethylene and tetrafluoroethylene.

The Radical Initiator

The identity of the radical initiator in the process of the present invention is not critical. The radical initiator is selected from those substances capable of generating radicals under the conditions of the polymerization reaction. The radical initiator may comprise a persulfate salt, such as, for example, potassium persulfate or ammonium persulfate. The radical initiator may comprise an azo initiator, such as, for example, 2,2'-azobis-(2,4-dimethyl-4-methoxyvaleronitrile) or azobisisobutyronitrile (AIBN). The radical initiator may comprise an organic peroxide such as an alkyl, dialkyl, or diacyl peroxide, preferably a ($C_1$-$C_6$)alkyl, e.g., for example, di-tert-butylperoxide (DFBP) or benzoyl peroxide; a peroxy ester, such as tert-amyl peroxypivalate, succinic acid peroxide or tert-butyl peroxypivalate; or a peroxydicarbonate, such as, for example, di-n-propyl peroxydicarbonate (NPP) or diisopropyl peroxydicarbonate (IPP).

The radical initiator may comprise a redox system. By "redox system" is meant a system comprising an oxidizing agent, a reducing agent and optionally, a promoter as an electron transfer medium. Oxidizing agents include, for example, persulfate salts, peroxides, such as hydrogen peroxide, hydroperoxides such as tert-butyl hydroperoxide or cumene hydroperoxide, and oxidizing metal salts such as, for example, ferric sulfate. Reducing agents include, for example, sodium formaldehyde sulfoxylate (SFS), sodium or potassium sulfite, ascorbic acid, bisulfite, metabisulfite, and reduced metal salts. The promoter is a component of the redox system which, in different oxidation states, is capable of reacting with both the oxidant and reducing agent, thereby accelerating the overall reaction. Promoters include, for example, transition metal salts such as ferrous sulfate. Redox systems are described by G. S. Misra, and U.D.N. Bajpai, *Prog. Polym. Sci.*, 1982, 8(1–2), pp. 61–131. A preferred redox system in the practice of the invention comprises potassium persulfate and sodium formaldehyde sulfoxylate, optionally, in combination with a promoter.

The radical initiator is added to the reaction mixture in an amount sufficient to initiate and maintain the polymerization reaction at a desired reaction rate. The order of addition may vary according to the desired process and the latex emulsion characteristics.

Preferred initiators and the amounts added to the reaction mixture (based upon the total weight of monomer added to the reaction mixture), include IPP or NPP, at from about 0.5 to about 2.5 weight percent, and potassium persulfate or ammonium persulfate at from about 0.01 to about 1.0 weight percent. In redox systems, the oxidizing agent and the reducing agent are utilized in an amount from about 0.01 to about 0.5 wt. %. The optional promoter is utilized in an amount from about 0.005 to about 0.025 wt. % (based upon the total weight of monomer added to the reaction mixture).

Chain-Transfer Agents

Chain-transfer agents which may be used are well-known in the polymerization of fluorinated monomers. Oxygenated compounds which may serve as chain-transfer agents in the practice of the present invention include, for example, alcohols, carbonates, ketones, esters, and ethers. Non-limiting, examples of such oxygenated compounds useful as chain-transfer agents include isopropyl alcohol, as described in U.S. Pat. No. 4,360,652; acetone, as described in U.S. Pat. No. 3,857,827; and ethyl acetate, as described in published Unexamined Japanese Patent Application (Kokai) JP 58065711.

Other classes of compounds which may serve as chain-transfer agents in the polymerization of halogen-containing monomers include, for example, halocarbons and hydrohalocarbons, such as chlorocarbons, hydrochlorocarbons, chlorofluorocarbons and hydrochlorofluorocarbons. Non-limiting, examples of such chain-transfer agents include trichlorofluoromethane, as described in U.S. Pat. No. 4,569,978; and 1,1-dichloro-2,2,2-trifluoroethane. In addition, ethane and propane may serve as chain-transfer agents in the polymerization of halogen-containing monomers.

Chain-transfer agents may be added to a polymerization reaction in a single portion at the beginning of the reaction, or incrementally or continuously throughout the reaction. The amount of the chain-transfer agent and the mode of addition depend on the activity of the particular chain-transfer agent employed, and on the desired molecular weight of the polymer product. The amount of chain train transfer agent added to the polymerization reaction is from about 0.05 wt. % to about 5 wt. %; preferably from about 0.1 wt. % to about 2 wt. % (based upon the total weight of monomer added to the reaction mixture).

Siloxane Surfactants

Siloxane surfactants useful in the practice of the present invention, and polydimethylsiloxane (PDMS) surfactants in particular, are described in *Silicone Surfactants*, R. M. Hill, Marcel Dekker, Inc., ISBN: 0-8247-00104, the entire disclosure of which is incorporated herein by reference. The structure of the siloxane surfactant comprises defined hydrophobic and hydrophilic portions. The hydrophobic portion comprises one or more dihydrocarbylsiloxane units:

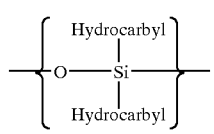

The hydrophilic portion of the surfactant may comprise one or more polar moieties including ionic groups such as sulfate, sulfonate, phosphonate, phosphate ester, carboxylate, carbonate, sulfosuccinate, taurate, phosphine oxide (as the free acid, a salt or an ester), betaine, betaine copolyol, or quaternary ammonium salt. Ionic hydrophilic moieties may also comprise ionically functionalized siloxane grafts, including polyelectrolytes. Siloxane surfactants containing such groups include, for example, polydimethylsiloxane-graft-(meth)acrylic acid salts, polydimethylsiloxane-graft-polyacrylate salts and polydimethylsiloxane grafted quaternary amines.

The polar moieties of the hydrophilic portion of the siloxane surfactant may comprise non-ionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers, from about 10 wt. % EO to 100 wt. % EO.

The hydrophilic portion of the siloxane surfactant may also comprise combinations of ionic and nonionic moieties. Such moieties include, for example, ionically end-functionalized or randomly functionalized polyether or polyol.

The arrangement of the hydrophobic and hydrophilic portions of the structure of a siloxane surfactant may take the form of a diblock polymer (AB), triblock polymer (ABA), wherein the "B" represents the siloxane portion of the molecule, or multi-block polymer. The siloxane surfactant may alternatively comprise a graft polymer. The term "graft polymer" refers to a polymer comprising molecules with one or more species of polymeric functionality connected to the main polymer backbone as side chains, wherein the sidechains, or grafts, have structural or functional characteristics that differ from the characteristics of the main polymer backbone. Each graft of a polymeric functionality to the main polymer backbone is a "pendant" group. The structure of the graft may be linear, branched or cyclic.

A graft polymer useful in the practice of the invention may comprise a hydrophobic main polymer backbone of dihydrocarbylsiloxane units to which one or more hydrophilic grafts are bonded. One structure comprising multiple grafts onto a main polymer backbone is a "rake" type structure (also called "comb"). A rake-type structure is compared to an ABA structure, below. Also see, R. Hill, Id at pages 5–6.

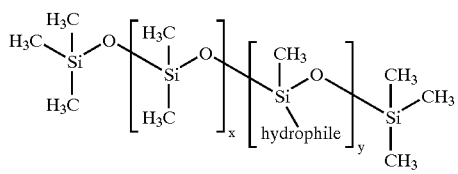

Rake-type structure

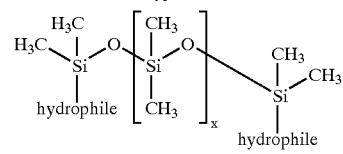

ABA-type structure

A trisiloxane is an additional structure type, related to the rake-type structure. A representative trisiloxane structure is depicted below.

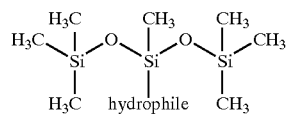

Trisiloxane structure

The siloxane portion of the surfactant molecule may be polymeric or oligomeric with regard to the dihydrocarbyl-siloxane unit. Siloxane portions of the surfactant molecule may comprise linear, branched or cyclic structures.

Representative examples of siloxane surfactants useful in the practice of the present invention are listed in Table 1. The trade name, generic name(s), Chemical Abstract Registry designation and selected chemical properties are provided. For mixed polyethylene oxide/polypropylene oxide polyethers (PEO/PPO), the weight percent of ethylene oxide (EO) is stated.

The weight percent of the siloxane portion of the listed siloxane surfactants was estimated by proton NMR analysis. For this analysis, the relative mole fractions of polyether moieties, $S_1$—$CH_2$ and $S_1$—$CH_3$ were determined and normalized to the $S_1$—$CH_2$ signal. The relative mole fractions and the formula weights of the siloxane partial structures were then used to estimate the siloxane weight percentage in each surfactant.

TABLE 1

Siloxane Surfactants

| Trade name | CAS # | Manufacturer | Siloxane content wt. % manufacturer | Siloxane content wt. % experimental | Structure type | Wt. % EO in PEO/PPO | Formula weight | Generic Name |
|---|---|---|---|---|---|---|---|---|
| Niax ® Silicone L-1000 | Not available | Crompton Corp. | Not available | 16. | — | — | — | Polyalkyleneoxidemethyl-siloxane copolymer |
| Silsoft ® 810 | 102783-01-7 | Crompton Corp. | Not available | 48. | — | — | — | Polyethyleneglycol-8 dimethicone |
| Silwet ® L-77 | 27306-78-1 | Crompton Corp. | Not available | 31. | trisiloxane | 100 | 600 | Polyalkyleneoxide modified heptamethyl-trisiloxane |

TABLE 1-continued

Siloxane Surfactants

| Trade name | CAS # | Manufacturer | Siloxane content wt. % manufacturer | Siloxane content wt. % experimental | Structure type | Wt. % EO in PEO/PPO | Formula weight | Generic Name |
|---|---|---|---|---|---|---|---|---|
| Silwet ® L-7087 | 67762-85-0 | Crompton Corp. | Not available | 19. | pendant | 40 | 20000 | Polyalkyleneoxide modified polydimethyl-siloxane |
| Silwet ® L-7200 | 68937-55-3 | Crompton Corp. | Not available | 24. | pendant | 75 | 19000 | Siloxane polyalkylene oxide copolymer |
| Silwet ® L-7210 | 68937-55-3 | Crompton Corp. | Not available | 7. | pendant | 20 | 13000 | Polyalkyleneoxide modified polydimethylsiloxane |
| Silwet ® L-7220 | 68937-55-3 | Crompton Corp. | Not available | 12. | pendant | 20 | 17000 | Polyalkyleneoxide methylsiloxane copolymer |
| Silwet ® L-7230 | 68937-55-3 | Crompton Corp. | Not available | 20. | pendant | 40 | 29000 | Polyalkyleneoxide methylsiloxane copolymer |
| Silwet ® L-7280 | 134180-76-0 | Crompton Corp. | Not available | 29. | trisiloxane | 60 | 600 | Polyalkyleneoxide modified heptamethyltrisiloxane |
| Silwet ® L-7600 | 68938-54-5 | Crompton Corp. | Not available | 15. | pendant | 100 | 4000 | Polyalkyleneoxide modified polydimethylsiloxane |
| Silwet ® L-7602 | 68938-54-5 | Crompton Corp. | Not available | 52. | pendant | 100 | 3000 | Polyalkyleneoxide modified polydimethylsiloxane |
| Silwet ® L-7604 | 68937-54-2 | Crompton Corp. | Not available | 29. | pendant | 100 | 4000 | Siloxane polyalkylene oxide copolymer |
| Silwet ® L7605 | 68938-54-5 | Crompton Corp. | Not available | 16. | pendant | 100 | 6000 | Polyalkyleneoxide modified polydimethylsiloxane |
| Silwet ® L-7607 | 117272-76-1 | Crompton Corp. | Not available | 21. | pendant | 100 | 1000 | Polyalkyleneoxide modified polymethylsiloxane |
| Silwet ® L-7608 | 67674-67-3 | Crompton Corp. | Not available | 32. | trisiloxane | 100 | 600 | Polyalkyleneoxide modified heptamethyltrisiloxane |
| Silwet ® L-7644 | Not available | Crompton Corp. | Not available | 26. | pendant | 100 | 5000 | Organomodified polydimethylsiloxane |
| Silwet ® L-7650 | 68937-54-2 | Crompton Corp. | Not available | 54 | pendant | 100 | 3000 | Polyalkyleneoxide modified polydimethylsiloxane |
| Silwet ® L-7657 | 68937-54-2 | Crompton Corp. | Not available | 21. | pendant | 100 | 5000 | Polyalkyleneoxide modified polydimethylsiloxane |
| Silwet ® L-8610 | 102783-01-7 | Crompton Corp. | Not available | 48. | linear | 100 | 1700 | Siloxane polyalkylene oxide copolymer |
| Silwet ® L-8620 | 102783-01-7 | Crompton Corp. | Not available | 57. | linear | 100 | 2000 | Siloxane polyalkylene oxide copolymer |
| Tegopren ® 5830 | Not available | Goldschmidt Chemical Corp. | Not available | 46. | ABA | 45 | — | Polyether modified polysiloxane |
| Tegopren ® 5840 | 68937-55-3 | Goldschmidt Chemical Corp. | Not available | 25. | rake | 60 | — | Polyether modified polysiloxane |
| Tegopren ® 5843 | Not available | Goldschmidt Chemical Corp. | Not available | 24. | rake | 100 | — | Polyether modified polysiloxane |
| Tegopren ® 5851 | Not available | Goldschmidt Chemical Corp. | Not available | 23. | rake | 75 | — | Polyether modified polysiloxane |
| Tegopren ® 5857 | Not available | Goldschmidt Chemical Corp. | Not available | 21. | — | 90 | — | Polyether modified polysiloxane |
| Tegopren ® 5863 | Not available | Goldschmidt Chemical Corp. | Not available | 18. | rake | 40 | — | Polyether modified polysiloxane |
| Tegopren ® 5873 | Not available | Goldschmidt Chemical Corp. | Not available | 19. | rake | 35 | — | Generic name not supplied on MSDS |
| Tegopren ® 5884 | Not available | Goldschmidt Chemical Corp. | Not available | 36. | rake | 77 | — | Polyether modified polysiloxane |
| Tegopren ® 6950 | Not available | Goldschmidt Chemical Corp. | Not available | not measured | rake, betaine | — | — | Polysiloxane betaine |
| GP-675 | 151662-01-0 | Genesee Polymers Corp. | 63 | 59. | ABA | <100 | 7970 | ABA silicone polyol copolymer |
| GP690 | 102783-01-7 | Genesee Polymers Corp. | 63 | 59. | ABA | 100 | 3170 | ABA silicone polyol copolymer |
| DBE-712 | 27306-78-1 | Gelest Inc. | 25 | 32. | trisiloxane | 100 | 600 | Dimethylsiloxane ethylene oxide block copolymer |
| DBE-732 | 67762-85-0 | Gelest Inc. | 30–35 | 18. | rake | 40 | 20000 | Dimethylsiloxane-(60% propylene oxide-40% ethylene oxide)block copolymer |
| none | Not available | Sigma Aldrich 56,456-7 (solid) 44,203-8 (aqueous) | 80 | not measured | — | NA | 26000 | Poly(dimethylsiloxane)-graft-polyacrylates |

The generic chemical names of the siloxane surfactants listed in Table 1 are as listed in the Material Safety Data Sheets (MSDS) supplied by the manufacturers listed in Table 1. The chemical names of several of the siloxane surfactants listed in Table 1 comprise certain descriptive nomenclature, such as the terms "modified" and "organomodified" that are well known in the art.

A siloxane surfactant (or mixture of siloxane surfactants) may be employed as the surfactant type in the practice of the present invention. Alternatively, one or more siloxane surfactants may be combined with one or more non-siloxane surfactants. The non-siloxane surfactant may comprise a perfluoroalkyl surfactant. The amount of a perfluoroalkyl surfactant required for an emulsion polymerization may be reduced by combination with one or more siloxane surfactants. Perfluoroalkyl surfactants have the general formula R—X⁻M⁺, wherein R is a perfluoroalkyl chain typically containing from about 5 to about 16 carbon atoms; X is typically $CO_2^-$; and M is a monovalent cation, typically $H^+$, $NH_4^+$ or an alkali metal ion. Ammonium perfluorooctanoate (AFPO) is among the most conmmon perfluoroalkyl surfactants. Other perfluoroalkyl surfactants include those disclosed in U.S. Pat. Nos. 2,559,752; 3,271,341; 4,076,929; 4,380,618; 4,569,978; 4,621,116; 4,789,717; 4,864,006; 5,093,427; 5,688,884; 5,763,552; 5,789,508; 6,187,885; 6,395,848; and 6,429,258; the entire disclosures of which are incorporated herein by reference.

Polymerization with non-fluorinated hydrocarbon surfactants may result in polymer lattices of low stability. Stability is improved by combining non-fluorinated hydrocarbon and siloxane surfactants. Representative non-fluorinated hydrocarbon surfactants suitable for combination with siloxane surfactants include, for example, polyoxypropylene-polyoxyethylene block copolymer (e.g., Pluronic® L92) and polyethylene glycol tert-octylphenyl ether (e.g., Triton® X405). The amount of siloxane surfactant and non-fluorinated hydrocarbon surfactant added to the polymerization reaction is from about 0.05 to about 0.3 weight percent for each surfactant, based on the total weight of monomer added to the reaction mixture.

Siloxane surfactants for use in the process of the present invention may be prepared by known methods, such as for example attaching one or more hydrophilic moieties to a siloxane backbone. Such attachment methods include, for example, (1) transetherification of a siloxane monomer ≡SiOR' and an alcohol R—OH; (2) hydrosilylation of an olefin $H_2C=CHCH_2R$ (where R is a hydrophilic moiety) by SiH; and (3) attachment of a reactive group by hydrosilylation, which reactive group is further derivatized to provide a hydrophilic group. Appropriate reaction and conditions for synthesizing siloxane surfactants are provided in Noll, W., *Chemistry and Technology of Silicones*, Academic Press (1968); Clarson and Semlyn, *Siloxane Polymers*, Prentice-Hall, (1993); Hardman, B., "Silicones", in the *Encyclopedia of Polymer Science* and *Engineering*, Vol. 15, 2nd Ed., J. Wiley and Sons, NY, N.Y. (1989); Gruning and Koerner, *Tenside Surf Deterg.*, 1989, 26(5), pp 312–317; and R. M Hill, Silicone Surfactants, Id. at Chapter 1, R. M. Hill, "Siloxane Surfactants," pp. 1–47, chapter 2, G. E. Legrow and L. J. Petroff, "Silicone Polyether Copolymers: synthetic Methods and Chemical Compositions," pp. 49–64, and chapter 3, G. Schmaucks, "Novel Siloxane Surfactant Structures," pp. 65–95; the entire disclosures of which are incorporated herein by reference.

The siloxane surfactants produced by a particular synthetic process may vary significantly from one another depending on the details of the preparation. This fact accounts for the frequent observation that published data on nominally identical samples is often not in agreement, and that use of nominally identical siloxane surfactants from different manufacturers may yield slightly different results in polymerization reactions of halogen-containing monomers.

Generally, the amount of surfactant added to the reaction mixture is from about 0.05 to about 2 weight percent, preferably about 0.1 to about 0.5 weight percent, based on the total weight of monomer added to the reaction mixture.

Buffering Agent

The polymerization reaction mixture can become more acidic as the reaction progresses. The performance of certain siloxane surfactants may be pH sensitive. Thus, the polymerization reaction mixture may contain a buffering agent to maintain a controlled pH throughout the polymerization reaction. The pH is preferably controlled within the range of from about 4 to about 8.

Buffering agents may comprise an organic or inorganic acid or alkali metal salt thereof, or base or salt thereof, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers and combinations thereof. A "phosphate buffer" is a salt of phosphoric acid. An "acetate buffer" is a salt of acetic acid. Non-limiting examples of phosphate buffers include $Na_3PO_4.12H_2O$ (sodium phosphate dodecahydrate), $Na_5P_5O_{10}$ (sodium triphosphate) and $Na_2HPO_4.7H_2O/K_2HPO_4$ Non-limiting examples of acetate buffers include sodium acetate and ammonium acetate. Buffering agents are preferably employed with certain siloxane surfactants such as poly(dimethylsiloxane)-graft-polyacrylates.

A preferred buffering agent when using a persulfate radical initiator is sodium acetate. A preferred amount of sodium acetate is from about 50 wt. % to about 150 wt. %, based on the total weight of persulfate initiator added to the reaction mixture. In one preferred embodiment, the initiator feed comprises equal amounts of potassium persulfate and sodium acetate in aqueous solution.

The Emulsion Polymerization Process

According to the one embodiment of the process of the invention, a pressurized polymerization reactor equipped with a stirrer and heat control means is charged with deionized water, one or more siloxane surfactants, and at least one monomer. The mixture may optionally contain one or more of a non-siloxane surfactant, a buffering agent and an antifoulant. The antifoulant may comprise a paraffin wax or hydrocarbon oil.

Prior to introduction of the monomer or monomers, air is preferably removed from the reactor in order to obtain an oxygen-free environment for the polymerization reaction. One method for accomplishing this is to subject the reactor to one or more cycles of purges with an inert gas, such as nitrogen or argon. This is generally done by charging the reactor with the reaction medium, e.g., deionized water, increasing the temperature to the selected reaction temperature, and pressurizing the reactor with the inert gas. The reactor is then vented to atmospheric pressure. Alternatively, the purge may be accomplished by subjecting the reactor to vacuum followed by purge with the inert gas, or by agitating and purging with inert gas through the vented reactor for a period of time. The purge procedures may be repeated if necessary.

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of oil or wax is preferably about 5 mg/cm² of the reactor interior surface area.

The order in which the polymerization components are assembled may be varied. For example, in one embodiment of the invention, the initial reactor charge may comprise water, preferably, deionized water, and one or more halogen-containing monomers. Polymerization is then initiated by feeding at least one radical initiator and at least one siloxane surfactant to the reactor. Alternatively, incremental or continuous feeds of halogen-containing monomer and radical initiator may be introduced into the reactor.

According to a sub-embodiment of the invention, there is provided a process of polymerization of a halogen-containing monomer comprising the steps of:
(a) charging a reactor with water, preferably deionized water;
(b) purging the reactor with an inert gas;
(c) heating the reactor to a desired reaction temperature;
(d) feeding to the heated reactor sufficient halogen-containing monomer to obtain a pressure in the reactor of at least about 3000 kPa;
(e) feeding to the reactor at least one radical initiator to start the polymerization of said halogen-containing monomer; and
(f) feeding to the reactor at least one siloxane surfactant.

According to another embodiment of the invention, the initial charge may comprise deionized water, at least one siloxane surfactant, an antifoulant and optionally a buffering agent. The temperature is increased, and monomer and initiator feeds are commenced.

The halogen-containing monomer and radical initiator may be fed simultaneously. They are preferably fed at a rate which provides an essentially constant pressure within the reactor.

According to another embodiment of the invention, the initial charge may comprise water, preferably deionized water, at least one siloxane surfactant, at least one radical initiator, and an antifoulant. Polymerization is then initiated by heating the reactor to a desired reaction temperature and feeding to the reactor at least one halogen-containing monomer.

According to a sub-embodiment of the invention, there is provided a process of polymerization of a halogen-containing monomer comprising the steps of:
(a) charging a reactor with water, preferably deionized water, at least one siloxane surfactant, at least one radical initiator and an antifoulant;
(b) purging the reactor with an inert gas;
(c) heating the reactor to a desired reaction temperature; and
(d) feeding to the heated reactor sufficient halogen-containing monomer to obtain a pressure in the reactor of at least about 3,000 kpa.

According to another embodiment of the invention, the initial charge may comprise water, preferably deionized water, at least one siloxane surfactant, at least one radical initiator, and an antifoulant. Polymerization is then initiated by heating the reactor to a desired reaction temperature and feeding to the reactor at least one halogen-containing monomer and at least one radical initiator.

According to a sub-embodiment of the invention, there is provided a process of polymerization of a halogen-containing monomer comprising the steps of:
(a) charging a reactor with water, preferably deionized water, at least one siloxane surfactant, at least one radical initiator and an antifoulant;
(b) purging the reactor with an inert gas
(c) heating the reactor to a desired reaction temperature;
(d) feeding to the heated reactor sufficient halogen-containing monomer to obtain a pressure in the reactor of at least about 3,000 kPa; and
(e) feeding to the reactor at least one radical initiator.

According to another embodiment of the invention, the initial charge to a reactor may comprise water, preferably deionized water, at least one siloxane surfactant, at least one radical initiator, and an antifoulant. Polymerization is then initiated by heating the reactor to a desired reaction temperature and feeding to the reactor at least one halogen-containing monomer and at least one siloxane surfactant.

According to another sub-embodiment of the invention, there is provided a process of polymerization of a halogen-containing monomer comprising the steps of:
(a) charging a reactor with water, preferably deionized water, at least one siloxane surfactant, at least one radical initiator and an antifoulant;
(b) purging the reactor with an inert gas
(c) heating the reactor to a desired reaction temperature;
(d) feeding to the heated reactor sufficient halogen-containing monomer to obtain a pressure in the reactor of at least about 3,000 kPa; and
(e) feeding to the reactor at least one siloxane surfactant.

According to another embodiment of the invention, the initial charge to a reactor may comprise water, preferably deionized water, and at least one radical initiator. Polymerization is then initiated by heating the reactor to the desired reaction temperature and feeding to the heated reactor at least one halogen-containing monomer and at least one siloxane surfactant.

According to another sub-embodiment of the invention, there is provided a process of polymerization of a halogen-containing monomer comprising the steps of:
(a) charging a reactor with water, preferably deionized water, and at least one radical initiator;
(b) purging the reactor with an inert gas
(c) heating the reactor to a desired reaction temperature;
(d) feeding to the heated reactor sufficient halogen-containing monomer to obtain a pressure in the reactor of at least about 3,000 kPa; and
(e) feeding to the reactor at least one siloxane surfactant.

The introduction of the initiator in the initial reactor charge before heating and pressurization with gaseous monomer has been observed to correlate with shorter induction time, shorter reaction times, and the requirement of less initiator.

The reaction temperature may be conveniently controlled by circulation of a controlled temperature heat exchange medium to a jacket surrounding the reactor. The preferred temperature range for polymerization reactions in the practice of the invention is from about 20° C. to about 160° C. The desired temperature depends in part, on the type of radical initiator employed. For two preferred radical initiators, IPP and NPP, the reaction temperature is preferably in the range of from about 750 C to about 95° C. For reactions wherein the initiator is a persulfate salt, the reaction temperature is preferably in the range of from about 65° C. to about 140° C. For reactions wherein the initiator is di-tert-butyl peroxide, the reaction temperature is preferably in the range of from about 110° C. to about 160° C. For reactions wherein the initiator is a redox system, the reaction temperature is suitably in the range of from about 10° C. to about 100° C., preferably of from about 30° C. to about 80° C. and more preferably in the range of from about 30° C. to about 60° C.

The reactor pressure is primarily regulated by controlling the feed of the gaseous halogen-containing monomer to the reaction. The pressure range preferred for the polymerization reactions is from about 280 kPa to about 20,000 kPa, more preferably from about 2000 kPa to about 1,000 kPa The feed rate of the initiator is advantageously regulated to maintain the desired polymerization rate. It is economically desirable to run the polymerization reaction as fast as possible, the limiting factors being the capacity of the heat exchange medium in the reactor jacket to remove the heat generated by the exothermic polymerization reaction and the stability characteristics of the latex being made in the reaction.

The monomer feed is terminated when the desired amount of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous emulsion containing the fluoropolymer is then recovered from the reactor as a latex. The latex consists of a stable mixture of the reaction components, ire., water, siloxane surfactant, initiator (and/or decomposition products of the initiator) and halogenated polymer solids. Generally, the latex contains from about 10 to about 50 weight percent polymer solids. The polymer in the latex is in the form of small particles having a size range of from about 30 nm to about 500 nm. The latex may be separated from coagulum by filtration methods known to the art.

When the latex is the desired product, the dispersion recovered from the reactor may be further stabilized by the addition of stabilizing surfactants and further concentrated by known techniques such as creaming or flash evaporation. If a dry product is desired, the reactor latex is coagulated and the recovered polymer is washed and dried by known drying methods. Coagulation, washing and drying methods are well known. The powdery product can be a substrate for preparation of coatings or may be extruded into pellets for melt processing by extrusion, injection molding, and compression molding.

The practice of the invention is illustrated by the following non-limiting examples.

EXAMPLES 1–9

Vinylidene Fluoride Homopolymerization

In the following experiment, the siloxane surfactant structure was varied (triblock copolymer, trisiloxane, polycarboxylic acid salt, polyethylene oxide, poly(ethylene oxide/propylene oxide)) in the homopolymerization of vinylidene fluoride.

Into a 2-liter stainless steel horizontal autoclave was charged 850 grams of deionized water at room temperature. The autoclave was closed, pressurized with nitrogen to about 240 kPa, heated to 80° C. under agitation and then vented to atmospheric pressure. Approximately 135 mL of vinylidene fluoride ($VF_2$) monomer, which had been maintained at about −6° C., and of approximate density of 0.86 g/mL, was charged into the autoclave to a pressure of about 3,800 kPa. An aqueous potassium persulfate solution (20 mL, 3 wt. % in deionized water at 6° C.) as radical initiator was fed into the autoclave at a rate of 5 mL/min. to begin polymerization. During the persulfate feed, the pressure decreased and the feed rate was changed to about 1 mL/min. Feeding of a surfactant solution from Table 2 was started about 10 minutes after the persulfate feed was initiated. Approximately 80 mL of surfactant solution (1.5 wt % surfactant in deionized water) was added under 3,800 kPa pressure throughout the $VF_2$ polymerization at a feed rate varying between 1–2 mL/min. The pressure in the autoclave was kept constant by varying the $VF_2$ feed rate. The surfactant/$VF_2$ feed ratio was balanced during the run in order to reach the desired final solid content (about 30 wt. %) at a desired surfactant content (0.28 wt. %, based on polymer weight). The reaction mixture was then allowed to react-out over a period of 10 minutes by adding 2–3 mL of initiator. Where a polydimethylsiloxane-graft-polyacrylates surfactant was used (Example 2), the surfactant solution was combined with a buffering agent consisting of 1.2 wt. % tribasic sodium phosphate dodecahydrate salt, based upon the weight of the surfactant solution. At the end of the react-out period, the autoclave was cooled, vented, drained and opened. The latex was removed and filtered. Polymer adhesion to the reactor walls was negligible. The adhered material was combined with the coagulum filtered from the latex and dried at 100° C. and quantified. A sample of the latex was dried at 110° C. in order to determine the solids content. Table 2 below gives specific conditions and product data for Examples 1–9.

TABLE 2

Vinylidene Fluoride Homopolymerization

| Example | Surfactant wt. % | Latex Solid weight[b] | Rxn. rate[c] mL/min | Latex coagulum Wt. %[a] |
| --- | --- | --- | --- | --- |
| Comparative Example 1 | Ammonium Perfluoroalkanoate 0.275 | 30.5 | 13.87 | 1.44 |
| Comparative Example 2 | none | 25.7 | 9.43 | 8.84 |
| 1 | Tegopren ® 6950[d] 0.35 | 25.4 | 8.88 | 26.0 |
| 2 | Aldrich 44, 203-8[e] 0.31 | 21.0 | 8.37 | <0.2 |
| 3 | Silsoft ® 810 0.284 | 29.6 | 8.5 | 0.9 |
| 4 | DBE 712 0.288 | 29.1 | 5.95 | 1.68 |
| 5 | Silwet ® L-77 0.287 | 29.2 | 6.71 | <0.2 |
| 6 | Silwet ® L-77 0.265 | 34.6 | 7.90 | 4.41 |
| 7 | Silwet ® L-7607 0.285 | 29.2 | 6.33 | <0.2 |
| 8 | Niax ® Silicone L-1000 0.285 | 29.2 | 6.93 | 5.90 |
| 9 | DBE 732 0.286 | 29 | 5.63 | 2.12 |

[a]Wt. % based on PVDF.
[b]Wt. % of solid PVDF in the latex.
[c]Reaction rate measured between 20% and 60% conversion.
[d]Tegopren ® 6950 was pre-treated to remove glycol as part of its solvent.
[e]PDMS-graft-polyacrylates was buffered to provide a latex pH of 4.23.

The highest reaction rate was 13.87 mL/min which occurred with the perfluoroalkanoate salt surfactant (Comparative Example 1). A low coagulum content of 1.44 wt. % was also noted for this reaction. An intermediate reaction rate was observed for the completely surfactant-free polymerization (Comparative Example 2) and for the siloxane surfactant Tegopren 6950 (Example 1). A high coagulun content was observed for both Example 1 and Comparative Example 2. All siloxane surfactants demonstrated polymerization rates of 5.6 to 8.9 mL/min. While these rates are lower than the polymerization rates obtained with the perfluoroalkyl surfactant (Comparative Example 1), the results are commercially acceptable and were obtained without perfluoroalkyl surfactants. The latex product of the reactions using siloxane surfactants was characterized by good stability and low coagulum. In particular, Example 6, with only 4.4 wt. % coagulum at 34.6 wt. % solid content, was substantially superior to Comparative Example 2 (no surfactant).

EXAMPLES 10–15

Vinylidene Fluoride Homo- and Co-Polymerization with Potassium Persulfate

Homopolymerization of $VF_2$ (Examples 10 and 11) was performed as above, or copolymerization of $VF_2$ with either hexafluoropropylene ("HFP", Examples 12, 13 and 14) or chlorotrifluoroethylene ("CTFE", Example 15). Reagent preparation and polymerization were performed as in Examples 1–9. The reaction was set up with an initial charge of 0.1 g of sodium formaldehyde sulfoxylate in the two-liter autoclave reactor. The reaction conditions and product data are reported in Table 3.

sium persulfate and sodium formaldehyde sulfoxylate as the radical initiator. A high polymerization rate at low surfactant content (Example 12) was obtained. The reaction yielded a stable latex with only 1.2 wt. % coagulum. A higher solid content was observed with acceptable copolymerization rate for the $VF_2$/HFP copolymerization of Example 14.

EXAMPLES 16–17

Polymerization with Hydrocarbon and Siloxane Surfactant Combinations

Reagent preparation and polymerization were performed as in Examples 1–9. Comparative Examples 3, 4 and 5 reflect polymerizations in the presence of hydrocarbon surfactants alone Examples 16 and 17 included surfactant combinations comprising a siloxane surfactant and a non-fluorinated hydrocarbon surfactant. The hydrocarbon surfactants were a poly(ethylene oxide/propylene oxide) block copolymer (Pluronic® L92) and a poly(ethylene oxide)

TABLE 3

Polymerization Homo- and Co-Polymerization with Potassium Persulfate.

| Example | Surfactant and Wt. % | monomers | pH | Latex Solid wt. %[i] | Rate[j] mL/min | Latex stability[h] coagulum wt. % |
|---|---|---|---|---|---|---|
| 10 | Silwet ® L77 0.15 | $VF_2$ | 2.2[q] | 26.3 | 4.03 | <0.4 |
| 11 | Aldrich 44, 203-8 0.16 | $VF_2$ | 7.02[n] | 22 | 9.57 | 1.2 |
| 12[k] | Aldrich 44, 203-8 0.32 | $VF_2$/HFP | 3.81[a] | 27 | 8.5 | 6.0 |
| 13[k] | Silsoft ® 810 0.38 | $VF_2$/HFP | (q) | 25.3 | 4.38 | <0.2 |
| 14[k] | Silsoft ® 810 0.58 | $VF_2$/HFP | (q) | 35.6 | 6.03 | 7.0 |
| 15[m] | Silwet ® L77 0.28 | $VF_2$/CTFE | (q) | 32.2 | 1.97 | 0.42 |

[h]Wt. % according to PVDF.
[i]Wt. % of solid PVDF in the latex.
[j]Reaction rate between 20% and 60% conversion.
[k]$VF_2$/HFP copolymer @ 90/10 wt. % wherein HFP was introduced as an initial charge.
[m]$VF_2$/CTFE copolymer @ 87.5/12.5 wt. % wherein CTFE was introduced continuously at a rate of 0.3 mL/min;
[n]$Na_3PO_4 \cdot 12H_2O$ was employed as a buffering agent with PDMS-graft-polyacrylates.
[q]without buffering agents;

These results show that siloxane surfactants may be employed in homo- and co-polymerizations utilizing potassium persulfate and sodium formaldehyde sulfoxylate as the tert-octylphenyl ether (Triton® X405). The reaction conditions and product data are reported in Table 4.

TABLE 4

Polymerization with Hydrocarbon and Siloxane Surfactant Combinations

| Example | Hydrocarbon Surfactant/Wt. % | Siloxane surfactant wt. % | Solid weight[i], % | Rate[j] mL/min | Latex stability[h] coagulum wt. % |
|---|---|---|---|---|---|
| Comparative Example 3 | Pluronic ® L92 0.287 | none | 29.2 | 8.20 | not stable; >60% |
| Comparative Example 4 | Pluronic ® L92 0.67 | none | 28.2 | 5.28 | not stable; >70% |
| Comparative Example 5 | Triton ® X405 0.289 | none | 28.0 | 5.82 | stable; 2.10 |
| 16 | Pluronic ® L92 0.137 | Silsoft ® 810 0.137 | 29.0 | 8.70 | stable; 5.80 |

TABLE 4-continued

Polymerization with Hydrocarbon and Siloxane Surfactant Combinations

| Example | Hydrocarbon Surfactant/Wt. % | Siloxane surfactant wt. % | Solid weight[i], % | Rate[j] mL/min | Latex stability[h] coagulum wt. % |
|---|---|---|---|---|---|
| 17 | Triton ® X405 0.14 | Silsoft ® 810 0.14 | 28.3 | 5.83 | stable; 0.71 |

[h]Wt. % according to PVDF.
[i]Wt. % of solid PVDF in the latex.
[j]Reaction rate between 20% and 60% conversion.

An acceptable polymerization rate was observed with the non-fluorinated hydrocarbon surfactant Pluronic® L92. However, the resulting latex was unstable. Combining the hydrocarbon surfactant with a siloxane surfactant (Examples 16 and 17) maintained the same reaction rate, but resulted in a stable latex.

EXAMPLES 18–23

Polymerization with Perfluoralkyl and Siloxane Surfactant Combinations

These experiments demonstrate that the requirement for perfluorinated alkyl surfactant in emulsion polymerization may be reduced by combination with a siloxane surfactant.

A. Procedure for Polymerization in the Presence of Surfactant Combinations with High Perfluoralkyl Surfactant Content.

A 2 liter stainless steel horizontal disposed autoclave was equipped with a stirrer, pressure and temperature controls. The reactor was charged with 900 g of deionized water containing 0.22 wt. % of an ammonium perfluoroalkanoate surfactant. The reactor was pressurized with nitrogen and the solution was degassed twice under agitation using alternate nitrogen purges. The pressure of the reactor was then raised up to about 55 kPa by increasing the temperature to 80° C. The reactor was vented, resealed, and $VF_2$ (which had been maintained at −6° C.) was added to the reactor to bring the pressure to 3800 kPa. A 20 mL portion of IPP solution (3 wt. % emulsion in water with surfactant) was added at a rate of 5 mL/min. When the pressure started to decrease, $VF_2$ was fed continuously from a cylinder of known volume into the head space of the reactor so as to maintain a pressure of about 3,800 kPa. At the same time, the IPP emulsion and a siloxane surfactant solution (1.3 wt. % in deionized water) were added at constant rates of 1 and 2 mL/min., respectively. After feeding the desired amount of $VF_2$, the monomer and the siloxane surfactant feeding were stopped while the reaction was allowed to continue by adding an additional 10 mL of initiator. Afterwards, the reaction system was brought to ambient temperature and ambient pressure, terminating the reaction. Residual monomer was vented. The resulting polymer latex was drained from the reactor. A visual inspection of the reactor was made to determine the amount of coagulated polymer in the reactor. After recovering any coagulated polymer from the reactor wall and filtration of the latex, the amount of coagulum was calculated according to the added $VF_2$ monomer in the reactor.

B. Procedure for Surfactant Combinations with Low Perfluoralkyl Surfactant Content:

The amount of ammonium perfluoroalkanoate surfactant was reduced to about 0.1 wt. %. The siloxane surfactant feed was 1.5 wt. % in deionized water. A solution of 1.3 wt % of tribasic sodium phosphate dodecahydrate was added as a buffering agent when the siloxane surfactant was polydimethyl siloxane-graft-polyacrylates (Aldrich 44,203–8). The initial reactor charge contained 845 g of deionized water and an aqueous solution of ammonium perfluoroalkanoate solution (55 g, 0.66 wt. %). The initiator was a 3 wt. % solution of potassium persulfate in deionized water. The reaction conditions were otherwise the same as described above for the experiments employing high perfluoralkyl surfactant content (Examples 18 and 9). All other autoclave and latex handling protocols were the same as in Examples 1–9. The reaction conditions and product data for Examples 18–23 are reported in Table 5.

TABLE 5

Polymerization with Perfluoralkyl and Siloxane Surfactant Combinations

| Example | Initiator | Perfluoro alkanoate surfactant Wt. % | Siloxane surfactant wt. % | pH | Solids wt. %[i] | Rate[j] mL/min | Latex stability[h] coagulum wt. % |
|---|---|---|---|---|---|---|---|
| Compar. Ex. 6 | IPP | 0.46 | None | 3.98 | 25.1 | 6.21 | Stable 1.0 |
| 18 | IPP | 0.46 | Silwet ® L77 0.045 | 3.93 | 25.3 | 4.38 | Stable 0.20 |
| 19 | IPP | 0.45 | Aldrich 44,203-8 0.044 | 4.20° | 28.0 | 8.1 | Stable 0.20 |
| 20 | IPP | 0.12 | Niax ® silicone L1000 0.093 | 3.75 | 23.0 | 2.30 | Stable 0.20 |

TABLE 5-continued

Polymerization with Perfluoralkyl and Siloxane Surfactant Combinations

| Example | Initiator | Perfluoro alkanoate surfactant Wt. % | Siloxane surfactant wt. % | pH | Solids wt. %[i] | Rate[j] mL/min | Latex stability[h] coagulum wt. % |
|---|---|---|---|---|---|---|---|
| 21 | persulfate | 0.117 | Aldrich 44,203-8 0.07 | 7.05[o] | 36 | 12.25 | Stable 3.2 |
| 22 | persulfate | 0.103 | Aldrich 44,203-8 0.09 | 7.4[o] | 35.3 | 15.77 | Stable 1.8 |
| 23[p] | persulfate[n] | 0.046 | Silsoft ® 810 0.21 | 3.24 | 45.1 | 7.96 | Stable 1.60 |

[h]Wt. % according to PVDF.
[i]Wt. % of solid PVDF in the latex.
[j]Reaction rate between 20% and 60% conversion.
[n]The initial charge in a two-liter reactor included 0.1 g of sodium formaldehyde sulfoxylate.
[o]Reaction buffered with $Na_3PO_4 \cdot 12H_2O$.
[p]$VF_2$/HFP copolymer @ 90/10 wt. % where HFP was introduced as initial charge.

In Comparative Example 6 ammonium perfluoralkanoate was the sole surfactant. In Examples 18–23, siloxane and ammonium perfluoralkanoate surfactants were combined and fed in a single solution. The solids content of the latex product for Examples 18 and 19 was determined to be 25–28 wt. % by weight as measured by drying 10 g of latex in a forced air oven for 40 minutes.

EXAMPLE 24

Polymerization with Potassium Persulfate Initiator

This experiment illustrates an embodiment of the invention where initiator (potassium persulfate) is added after the reactor is heated and pressurized. To a 7.5 liter, stainless steel reactor was added 5.000 kg of water, 0.004 kg of paraffin wax, 0.006 kg of a pendant siloxane surfactant (Silwet® L-7210), 0.0075 kg of sodium hydrogen phosphate heptahydrate, and 0.000476 kg of monobasic potassium phosphate. The mixture was purged with argon and agitated for 0.5 hours. The reactor was sealed, agitation was continued, and the reactor was heated to 82° C. and held at that temperature until the end of the polymerization reaction. The reactor was charged with 0.396 kg of $VF_2$ and stabilized at 82° C. and 4480 kPa. Aqueous potassium persulfate (0.152 L of 3.5 wt. % solution; 0.0053 kg of potassium persulfate) was introduced to the reactor over a 0.25 hour period. The pressure rose to 4700 kPa with the persulfate addition. The polymerization reaction began 0.6 hours after the completion of the persulfate solution addition, and the pressure subsequently dropped to 4480 kPa. The pressure was maintained at this level for the remainder of the reaction by the addition of $VF_2$ as needed. To maintain the reaction, two additional 0.020 L aliquots of the potassium persulfate solution were added, at 0.5 hours and 1.8 hours following the beginning of the reaction. After 3.2 hours of reaction, the $VF_2$ feed was stopped. A total of 2.210 kg of $VF_2$ had been added to the reactor to this point. The agitation was continued and the reaction temperature was maintained for a period of 0.2 hours, after which the agitation and heating were discontinued. After cooling to room temperature, surplus gas was vented, and the reactor was emptied of latex through a stainless steel mesh. No coagulum formed during the reaction. The reactor was rinsed with water. Solids measurements of the latex and rinse showed the polymer yield to be 88 wt. % on the total weight of the $VF_2$ monomer which was fed to the reactor. The amount of potassium persulfate required to convert the $VF_2$ to polymer was 0.30 wt. %, based on the $VF_2$ weight.

EXAMPLE 25

Polymerization with Potassium Persulfate Initiator

This experiment illustrates an embodiment of the invention where initiator (potassium persulfate) is added before the reactor is heated and pressurized, and where a buffering agent (sodium acetate) is mixed with the initiator to buffer the reaction. To a 7.5 liter, stainless steel reactor was added 5.090 kg of water, 0.004 kg of paraffin wax, 0.006 kg of a pendant siloxane surfactant (Silwet® L-7210), and 0.1110 L of an aqueous solution containing the initiator potassium persulfate (2.0 wt. %) and the buffering agent sodium acetate (2.0 wt. %). The mixture was purged with argon and agitated for 0.5 hours. The reactor was sealed, agitation was continued, and the reactor was heated to 82° C. and held at that temperature until the end of the polymerization reaction. The reactor was charged with 0.364 kg $VF_2$ to bring the pressure to 4480 kPa. The reaction began immediately. More $VF_2$ was added as necessary to maintain that pressure until the end of the reaction. Potassium persulfate/sodium acetate solution was added continuously over the remainder of the reaction at a rate of 0.006–0.018 L/hour. After 2.0 hours, the $VF_2$ feed was stopped. A total of 2.200 kg had been added to the reactor to this point. A total amount, 0.130 L, of potassium persulfate/sodium acetate solution had been added to the reactor to this point, including the amount added before heating and pressurization. The agitation was continued and the reaction temperature was maintained for a period of 0.1 hours. The agitation and heating were then discontinued. After cooling to room temperature, surplus gas was vented, and the reactor was emptied of latex through a stainless steel mesh. The reactor was rinsed with water, and solids measurements of the latex and rinse showed the polymer yield to be 93 wt. % on the total weight of $VF_2$ fed to the reactor. Coagulum caught on the filter mesh was <1 wt. %. The amount of potassium persulfate required to convert the $VF_2$ to polymer was 0.12 wt. % based on the weight of $VF_2$.

All references cited herein are incorporated by reference. The present invention may be embodied in other specific forms without departing from the spirit or essential attributes thereof and, accordingly, reference should be made to the appended claims, rather than to the foregoing specification, as indication the scope of the invention.

What is claimed is:

1. A process for preparing a halogenated polymer comprising polymerizing at least one halogen-containing monomer in an aqueous medium comprising at least one siloxane surfactant, in the presence of at least one radical initiator, wherein the halogen-containing monomer is selected from the group consisting of vinylidene fluoride, trifluoroethylenevinylidene difluoride, tetrafluoroethylene, trifluoroethylene, chlorotrifluoroethylene, hexafluoropropylene, vinyl fluoride, hexafluoroisobutylene, perfluorobutylethylene, pentafluoropropene and combinations thereof.

2. The process according to claim 1 wherein said siloxane surfactant has the formula I:

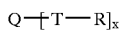

wherein

Q is a hydrophobic siloxane moiety;

R is a monovalent hydrophilic moiety; and

T is —(C$_1$–C$_6$)alkylene-, wherein each T is bonded to a silicon atom in Q; and X is an integer from 1 to 300; or a salt of such a compound.

3. The process according to claim 2 wherein the siloxane surfactant has the formula II, III or IV:

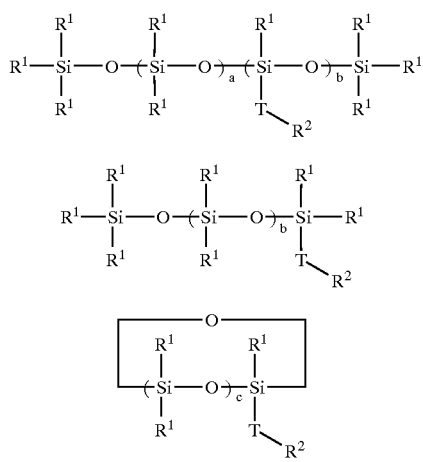

wherein a is an integer from 0 to 300;

b is an integer from 1 to 300, wherein the sum of a and b is less than or equal to 301;

c is an integer selected from 3, 4 and 5;

each R$^1$ is independently selected from —(C$_1$–C$_8$) hydrocarbyl;

each R$^2$ is a hydrophilic moiety independently selected from the group consisting of:
- —O(C=O)CH(SO$_3^-$M$^+$)CH$_2$CO$_2^-$M$^+$,
- —OCH$_2$—CH(OH)—CH$_2$SO$_3^-$M$^+$,
- —OCH$_2$—C(C$_2$H$_5$)(CH$_2$OSO$_3^-$M$^+$)$_2$,
- —OCH$_2$—CH(OH)—CH$_2$—NH(CH$_2$)$_2$—SO$_3^-$M$^+$,
- —OP(=O)(OH)(O$^{31}$ M$^+$),
- —OCH$_2$—CH(OH)—CH$_2$N$^+$(R$^4$)$_2$CH$_2$CO$_2^-$,
- —OCH$_2$—CH(OH)—CH$_2$N$^+$(R$^4$)$_2$CH$_2$SO$_3^-$,
- —N$^+$(R$^4$)$_3$Y$^-$,
- —N$^+$(R$^4$)$_2$—(CH$_2$)$_3$SO$_3^-$,
- —N$^+$(R$^4$)$_2$(CH$_2$)$_3$CO$_2^-$,
- a polyether radical,
- a pyrrolidinone radical,
- a monosaccharide radical,
- a disaccharide radical and
- a polyelectrolyte radical;

each T is —(C$_1$–C$_6$)alkylene-;

R$^3$ is selected from R$^1$ and —T—R$^2$;

each R$^4$ is independently selected from the group consisting of —H and —(C$_1$–C$_8$)alkyl;

each M is a monovalent cation; and each Y is a monovalent anion; or a salt thereof;

provided:

when R$^2$ is a pyrrolidinone radical, it is bonded to T through the nitrogen atom of the pyrrolidinone;

when R$^2$ is a monosaccharide radical it is covalently bonded to T through an oxygen atom of the monosaccharide; and when R$^2$ is a disaccharide radical, it is covalently bonded to T through an oxygen atom of the disaccharide.

4. The process according to claim 3 wherein M is NR$^4_4{}^+$ or an alkali metal cation.

5. The process according to claim 3 wherein R$^2$ is a polyether radical.

6. The process according to claim 5 wherein said polyether radical is end-capped with —OH or —OR$^4$.

7. The process according to claim 6 wherein R$^2$ is a polyether radical comprising ethylene oxide units.

8. The process according to claim 7 wherein the number of ethylene oxide units in said polyether radical is up to about 500.

9. The process according to claim 5 wherein R$^2$ is a polyether radical comprising a mixture of ethylene oxide units and propylene oxide units.

10. The process according to claim 9 wherein the ratio of ethylene oxide to propylene oxide units in said polyether radical is from about 10 wt. % ethylene oxide to 100 wt. % ethylene oxide.

11. The process according to claim 10 wherein the combined number of ethylene oxide and propylene oxide units in said polyether radical is up to about 500.

12. The process according to claim 3 wherein R$^1$ is phenyl or —(C$_1$–C$_8$)alkyl.

13. The process according to claim 12 wherein R$^1$ is methyl.

14. The process according to claim 1 wherein the siloxane surfactant is selected from the group consisting of:

polyalkyleneoxidemethylsiloxane copolymer;

polyethyleneglycol-8 dimethicone;

polyalkyleneoxide modified heptamethyltrisiloxane;

polyalkyleneoxide modified polydimethylsiloxane;

siloxane polyalkylene oxide copolymer;

polyalkyleneoxide methylsiloxane copolymer;

polyalkyleneoxide modified polymethylsiloxane;

organomodified polydimethylsiloxane;

polyether modified polysiloxane;

polysiloxane betaine;

ABA silicone polyol copolymer;

dimethylsiloxane ethylene oxide block copolymer;

poly(dimethylsiloxane)-graft-polyacrylates; and combinations thereof.

15. The process according to claim 1 wherein the siloxane surfactant has a trisiloxane structure wherein one or more hydrocarbyl substituents on silicon has been replaced with a polyether substituent that comprises about 60 wt. % propylene oxide and about 40 wt. % ethylene oxide.

16. The process of claim 1 wherein the halogen-containing monomer comprises vinylidene fluoride.

17. The process of claim 16 wherein the aqueous medium further comprises at least one comonomer selected from the group consisting of tetrafluoroethylene; trifluoroethylene; chlorotrifluoroethylene; hexafluoropropene; vinyl fluoride; hexafluoroisubutylene; perfluorobutylethylene; pentafluoropropene, a fluorinated vinyl ether, a fluorinated allyl ether, a non-fluorinated allyl ether, a fluorinated dioxole, and combinations thereof.

18. The process of claim 17 wherein the fluorinated vinyl ether is selected from the group consisting of perfluoromethyl vinyl ether, perfluoro-n-propyl vinyl ether, and perfluoro-2-propoxypropyl vinyl ether.

19. The process of claim 17 wherein the fluorinated dioxole is selected from the group consisting of perfluoro (1,3-dioxole) and perfluoro(2,2-dimethyl)-1,3-dioxole.

20. The process of claim 1 wherein the aqueous medium further comprises one or more non-siloxane surfactants.

21. The process of claim 1 wherein the aqueous medium further comprises a buffering agent.

22. The process of claim 21 wherein said buffering agent maintains the pH of the aqueous medium in the range of from about 4 to about 10.

23. The process of claim 1 wherein the radical initiator is a persulfate salt.

24. The process of claim 23 wherein the radical initiator comprises ammonium persulfate, potassium persulfate, or a combination thereof.

25. The process of claim 24 wherein the radical initiator further comprises sodium formaldehyde sulfoxylate.

26. The process of claim 1 wherein the radical initiator is a peroxide.

27. The process of claim 26 wherein the peroxide is selected from the group consisting of a ($C_1$–$C_6$) alkylhydroperoxide, a di-($C_1$–$C_6$)alkyl peroxide, an aryl peroxide, and combinations thereof.

28. The process of claim 27 wherein the radical initiator is di-tert-butyl peroxide.

29. The process of claim 1 wherein the radical initiator is a peroxydicarbonate compound.

30. The process of claim 29 wherein the peroxydicarbonate compound is selected from the group consisting of diisopropyl peroxydicarbonate, di-n-propyl peroxydicarbonate, and combinations thereof.

31. The process of claim 1 wherein the radical initiator is an azo compound.

32. The process of claim 31 wherein the azo compound is selected from the group consisting of 2,2'-azobis-(2,4-dimethyl-4-methoxyvaleronitrile), azobisisobutyronitrile, and combinations thereof.

33. The process of claim 1 wherein the radical initiator comprises a redox system.

34. The process of claim 1 wherein the aqueous medium further comprises a chain-transfer agent.

35. The process of claim 34 wherein said chain-transfer agent is selected from the group consisting of alcohols, carbonates, ketones, esters, ethers, chlorocarbons, hydrochlorocarbons, chlorofluorocarbons, hydrochlorofluorocarbons, and combinations thereof.

36. The process of claim 34 wherein said chain-transfer agent is selected from the group consisting of isopropyl alcohol, acetone, ethyl acetate, trichlorofluoromethane, 1,1-dichloro-2,2,2-trifluoroethane, ethane, propane and combinations thereof.

37. A process for preparing a halogenated polymer comprising polymerizing at least one halogen-containing monomer in an aqueous medium comprising at least one siloxane surfactant, in the presence of at least one radical initiator, wherein the siloxane surfactant has the formula II, III or IV:

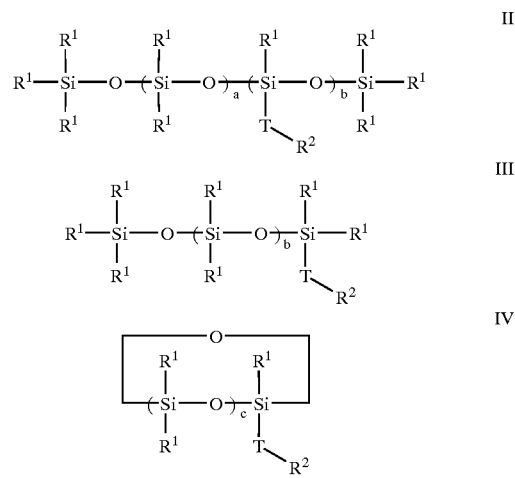

wherein
a is an integer from 0 to 300;
b is an integer from 1 to 300, wherein the sum of a and b is less than or equal to 301;
c is an integer selected from 3, 4 and 5;
each $R^1$ is independently selected from —($C_1$–$C_8$) hydrocarbyl;
each $R^2$ is a polyelectrolyte radical;
each T is —($C_1$–$C_6$)alkylene-; and
$R^3$ is selected from $R^1$ and —T—$R^2$.

38. The process according to claim 37 wherein said polyelectrolyte radical is selected from the group consisting of radicals of acrylic and methacrylic acid polymers and salts thereof, and radicals of acrylic and methacrylic acid copolymers with acrylate and methacrylate esters, and salts thereof.

39. A process for preparing a halogenated polymer comprising polmerizing at least one halogen-containing monomer in an aqueous medium comprising at least one siloxane surfactant, in the presence of at least one radical initiator, wherein the aqueous medium further comprises one or more non-fluorinated hydrocarbon non-siloxane surfactants.

40. A process for preparing a halogenated polymer comprising polymerizing at least one halogen-containing monomer in an aqueous medium comprising at least one siloxane surfactant, in the presence of at least one radical initiator, wherein the aqueous medium further comprises one or more perfluoroalkyl non-siloxane surfactants.

41. A process for preparing a halogenated polymer comprising polymerizing at least one halogen-containing monomer in an aqueous medium comprising at least one siloxane surfactant, in the presence of at least one radical initiator, wherein the aqueous medium further comprises a buffering agent that maintains the pH of the aqueous medium in the range of from about 4 to about 10 and wherein the buffering agent is selected from the group consisting of acetate buffers, phosphate buffers and combinations thereof.

42. A process for preparing a halogenated polymer comprising polymerizing at least one halogen-containing monomer in an aqueous medium comprising at least one siloxane surfactant, in the presence of at least one radical initiator, wherein the aqueous medium further comprises a chain-transfer agent selected from the group consisting of ethane and propane.

43. A process for preparing a halogenated polymer comprising polymerizing at least one halogen-containing monomer in an aqueous medium comprising at least one siloxane surfactant, in the presence of at least one radical initiator, wherein polymerization of said halogen-containing monomer is obtained by:
(a) charging a reactor with deionized water;
(b) purging the reactor with an inert gas;
(c) heating the reactor to a desired reaction temperature;
(d) feeding to the heated reactor sufficient halogen-containing monomer to obtain a pressure in the reactor of at least about 3000 kPa;
(e) feeding to the reactor at least one radical initiator to start the polymerization of said monomer; and
(f) feeding to the reactor at least one siloxane surfactant.

44. The process according to claim 43, further comprising feeding additional monomer, radical initiator and siloxane surfactant to the reactor during the polymerization process in amounts sufficient to maintain the polymerization of said monomer.

45. A process for preparing a halogenated polymer comprising polymerizing at least one halogen-containing monomer in an aqueous medium comprising at least one siloxane surfactant, in the presence of at least one radical initiator, wherein polymerization of said halogen-containing monomer is obtained by:
(a) charging a reactor with water and at least one radical initiator;
(b) purging the reactor with an inert gas
(c) heating the reactor to a desired reaction temperature;
(d) feeding to the heated reactor sufficient halogen-containing monomer to obtain a pressure in the reactor of at least about 3,000 kPa; and
(e) feeding to the reactor at least one siloxane surfactant.

46. The process according to claim 45 further comprising feeding additional monomer, radical initiator and siloxane surfactant to the reactor during the polymerization process in amounts sufficient to maintain the polymerization of said monomer.

47. A process for preparing a halogenated polymer comprising polymerizing at least one halogen-containing monomer in an aqueous medium comprising at least one siloxane surfactant, in the presence of at least one radical initiator, wherein polymerization of said halogen-containing monomer is obtained by:
(a) charging a reactor with water, at least one siloxane surfactant, at least one radical initiator and an antifoulant;
(b) purging the reactor with an inert gas;
(c) heating the reactor to a desired reaction temperature; and
(d) feeding to the heated reactor sufficient halogen-containing monomer to obtain a pressure in the reactor of at least about 3,000 kPa.

48. The process according to claim 47, further comprising
(e) feeding to the reactor at least one radical initiator.

49. An aqueous composition comprising at least one halogen-containing monomer, at least one siloxane surfactant and at least one radical initiator, wherein the halogen-containing monomer is selected from the group consisting of vinylidene fluoride, trifluoroethylenevinylidene difluoride, tetrafluoroethylene, trifluoroethylene, chlorotrifluoroethylene, hexafluoropropylene, vinyl fluoride, hexafluoroisubutylene, perfluorobutylethylene, pentafluoropropene and combinations thereof.

50. The composition according to claim 49 wherein said siloxane surfactant has the formula I:

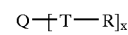

wherein
Q is a hydrophobic siloxane moiety;
R is a monovalent hydrophilic moiety; and
T is —(C$_1$–C$_6$)alkylene-, wherein each T is bonded to a silicon atom in Q; and
X is an integer from 1 to 300; or
a salt of such a compound.

51. The composition according to claim 50 wherein the siloxane has the formula II, III or IV:

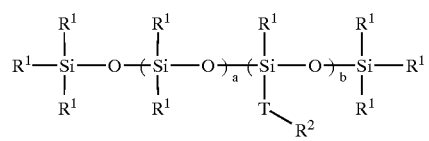

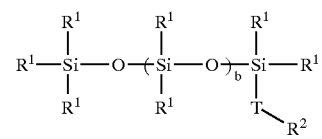

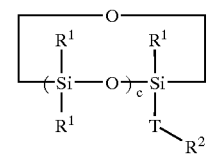

wherein
a is an integer from 0 to 300;
b is an integer from 1 to 300, wherein the sum of a and b is less than or equal to 301;
c is an integer selected from 3, 4 and 5;
each R$^1$ is independently selected from —(C$_1$–C$_8$) hydrocarbyl;
each R$^2$ is a hydrophilic moiety independently selected from the group consisting of:
—O(C=O)CH(SO$_3^-$M$^+$)CH$_2$CO$_2^-$M$^+$,
—OCH$_2$—CH(OH)—CH$_2$SO$_3^-$M$^+$,
—OCH$_2$—C(C$_2$H$_5$)(CH$_2$OSO$_3^-$M$^+$)$_2$,
—OCH$_2$—CH(OH)—CH$_2$—NH(CH$_2$)$_2$—SO$_3^-$M$^+$,
—OP(=O)(OH)(O$^-$M$^+$),
—OCH$_2$—CH(OH)—CH$_2$N$^+$(R$^4$)$_2$CH$_2$CO$_2^-$,
—OCH$_2$—CH(OH)—CH$_2$N$^+$(R$^4$)$_2$CH$_2$SO$_3^-$,
—N$^+$(R$^4$)$_3$Y$^-$,
—N$^+$(R$^4$)$_2$—(CH$_2$)$_3$SO$_3^-$, —N$^+$(R$^4$)$_2$(CH$_2$)$_3$CO$_2$,
a polyether radical,
a pyrrolidinone radical,
a monosaccharide radical,
a disaccharide radical and
a polyelectrolyte radical;

each T is —(C$_1$-C$_6$)alkylene-;

R$^3$ is selected from R$^1$ and —T—R$^2$;

each R$^4$ is independently selected from the group consisting of —H and —(C$_1$-C$_8$)alkyl;

each M is a monovalent cation; and each Y is a monovalent anion; or a salt thereof;

provided:

when R$^2$ is a pyrrolidinone radical, it is bonded to T through the nitrogen atom of the pyrrolidinone;

when R$^2$ is a monosaccharide radical, it is covalently bonded to T through an oxygen atom of the monosaccharide; and when R$^2$ is a disaccharide radical, it is covalently bonded to T through an oxygen atom of the disaccharide.

52. The composition according to claim 51 wherein M is NR$^4_4{}^+$ or an alkali metal cation.

53. The composition according to claim 51 wherein R$^2$ is a polyether radical.

54. The composition according to claim 53 wherein said polyether radical is end-capped with —OH or —OR$^4$.

55. The composition according to claim 53 wherein said polyether radical is composed of ethylene oxide units.

56. The composition according to claim 53 wherein said polyether radical is composed of a mixture of ethylene oxide units and propylene oxide units.

57. The composition according to claim 56 wherein the ratio of ethylene oxide to propylene oxide units is from about 10 wt. % ethylene oxide to 100 wt. % ethylene oxide.

58. The composition according to claim 57 wherein the combined number of ethylene oxide and propylene oxide units is up to about 500.

59. An aqueous composition for polymerizing a halogen-containing monomer comprising at least one halogen-containing monomer, at least one siloxane surfactant and at least one radical initiator, wherein the siloxane surfactant has the formula II, III or IV:

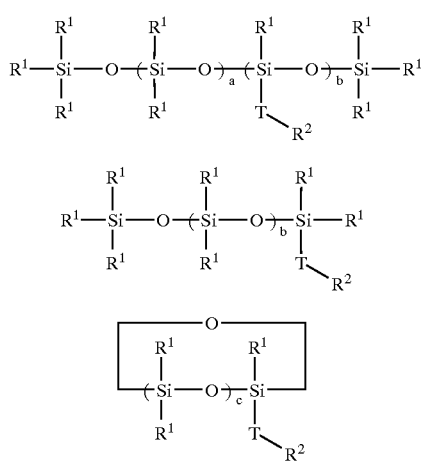

wherein a is an integer from 0 to 300;

b is an integer from 1 to 300, wherein the sum of a and b is less than or equal to 301;

c is an integer selected from 3, 4 and 5;

each R$^1$ is independently selected from —(C$_1$-C$_8$) hydrocarbyl, each R$^2$ is a polyelectrolyte radical;

each T is —(C$_1$-C$_6$)alkylene-; and

R$^3$ is selected from R$^1$ and —T—R$^2$.

60. The composition according to claim 59 wherein said polyelectrolyte radical is selected from the group consisting of radicals of acrylic and methacrylic acid polymers and salts thereof, and radicals of acrylic and methacrylic acid copolymers with acrylate and methacrylate esters.

61. The composition according to claim 51 wherein R$^1$ is phenyl or —(C$_1$-C$_8$)alkyl.

62. The composition according to claim 61 wherein R$^1$ is phenyl or methyl.

63. The composition according to claim 50 wherein the siloxane surfactant is selected from the group consisting of:

polyalkyleneoxidemethylsiloxane copolymer;

polyethyleneglycol-8 dimethicone;

polyalkyleneoxide modified heptamethyltrisiloxane;

polyalkyleneoxide modified polydimethylsiloxane;

siloxane polyalkylene oxide copolymer;

polyalkyleneoxide methylsiloxane copolymer;

polyalkyleneoxide modified polymethylsiloxane;

organomodified polydimethylsiloxane;

polyether modified polysiloxane;

polysiloxane betaine;

ABA silicone polyol copolymer;

dimethylsiloxane ethylene oxide block copolymer;

poly(dimethylsiloxane)-graft-polyacrylates; and combinations thereof.

64. The composition according to claim 50 wherein the siloxane surfactant has a trisiloxane structure wherein one or more hydrocarbyl substituents on silicon has been replaced with a polyether substituent that comprises about 60 mol % propylene oxide and about 40 mol % ethylene oxide.

65. An aqueous composition for polymerizing a halogen-containing monomer comprising at least one halogen-containing monomer, at least one siloxane surfactant and at least one radical initiator, wherein said siloxane surfactant has the formula 1:

$$Q{-}[T{-}R]_x \qquad\qquad I$$

wherein

Q is a hydrophobic siloxane moiety;

R is a monovalent hydrophilic moiety; and

T is —($_1$-C$_5$)alkylene-, wherein each T is bonded to a silicon atom in Q; and X is an integer from 1 to 300; or a salt of such a compound; and wherein the halogen-containing monomer is selected from the group consisting of vinylidene fluoride, trifluoroethylenevinylldene difluoride, tetrafluoroethylene, trifluoroethylene, chlorotrifluoroethylene, hexafluoropropylene, vinyl fluoride, hexafluorolsubutylene7, perfluorobutylethylene, pentafluoropropene and combinations thereof.

66. The composition of claim 65 wherein the halogen-containing monomer comprises vinylidene fluoride.

* * * * *